Figure 6:
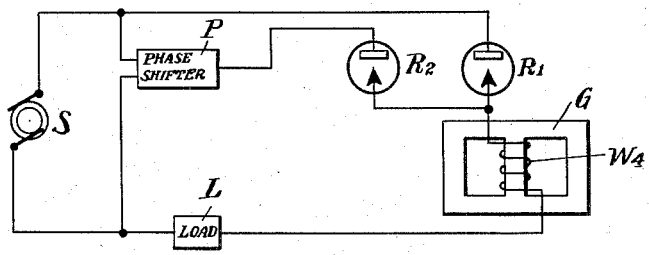

Oct. 16, 1934.　　　F. G. LOGAN　　　1,977,193
ELECTRIC CONTROLLING APPARATUS
Filed June 14, 1932　　　3 Sheets-Sheet 1
Fig. 1
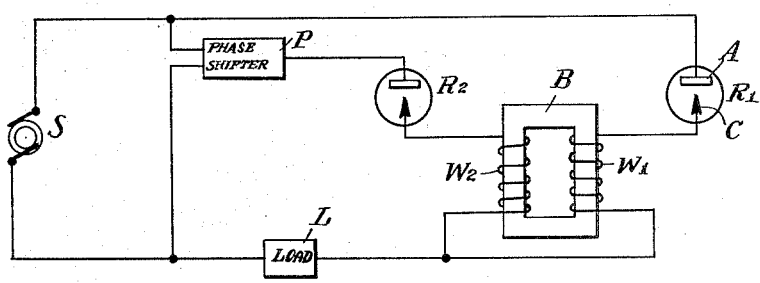
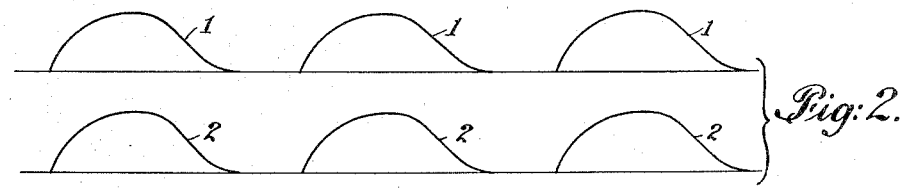
Fig. 2.
Fig. 3
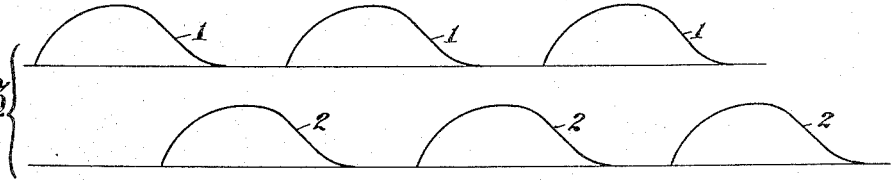
Fig. 4.
Fig. 5
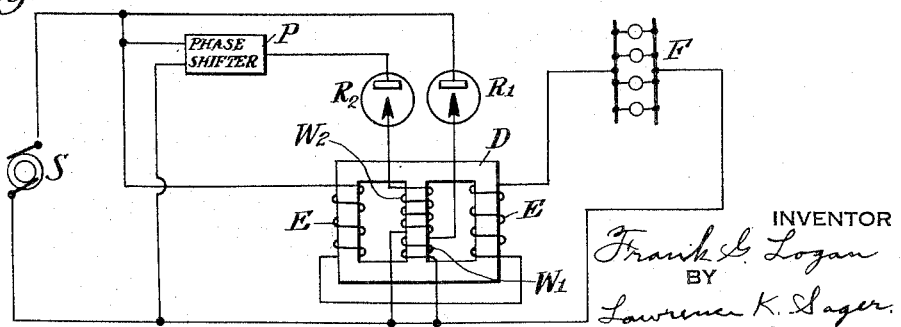
INVENTOR
Frank G. Logan
BY
Lawrence K. Sager
ATTORNEY Oct. 16, 1934.  F. G. LOGAN  1,977,193
ELECTRIC CONTROLLING APPARATUS
Filed June 14, 1932   3 Sheets-Sheet 3

INVENTOR
Frank G. Logan
BY
Lawrence K. Sager
ATTORNEY

Patented Oct. 16, 1934

1,977,193

UNITED STATES PATENT OFFICE 1,977,193

ELECTRIC CONTROLLING APPARATUS

Frank G. Logan, Mount Vernon, N. Y., assignor to Ward Leonard Electric Company, a corporation of New York Application June 14, 1932, Serial No. 617,162

23 Claims. (Cl. 171—119)

This invention relates to the control of the output of energy from a source of alternating current, the particular object being to vary the output as desired and to accomplish this by an improved form of apparatus and method of control whereby the current in the consumption circuit is changed as desired over a wide range substantially without control of the potential or voltage, or change thereof applied to or impressed upon the consumption circuit. Although the invention is applicable to various purposes, it is especially advantageous for the control of lighting circuits where it is desired to change the lighting effects from time to time as, for example, in theatres where the lighting effect is changed for different scenes.

In accordance with the present invention, the control is obtained by supplying current intermittently to two or more circuits and so controlling and relating the current delivered thereto that the phase relationship thereof is shifted, thereby changing the output as desired.

One of the main objects of the invention is to provide an improved method and apparatus for controlling the energy in the consumption circuit with high efficiency and the avoidance of wasteful heat losses. Another object is to secure a very wide range of control of the energy in the consumption circuit. Another object is to provide a simple method of control and one which may be carried out by comparatively simple forms of apparatus which may be readily and conveniently controlled and which will be dependable, durable and capable of efficient operation. Another object is to permit the use of simple forms of rectifiers such as two element tubes or any type of two element rectifier. Another object which is particularly applicable to the control of lighting circuits, is to avoid the necessity of an auxiliary source of direct current for the control of the alternating current energy, as this is supplied, in the present invention, by the rectifiers. The invention is further advantageous in permitting the controlling means to be located at a point remote from the main apparatus and permitting the use of a comparatively small amount of controlling current relatively to the total controlled current. Another advantage is that the invention provides convenient means for gradually decreasing the current in one circuit while increasing the current in another, and also permits the use of any desired number of presets and their proper inter-relation so that the lighting effects desired for various sequential scenes may be conveniently and quickly controlled by the operator.

Various other objects and advantages of this invention will be understood from the following description and accompanying drawings.

Figure 7:
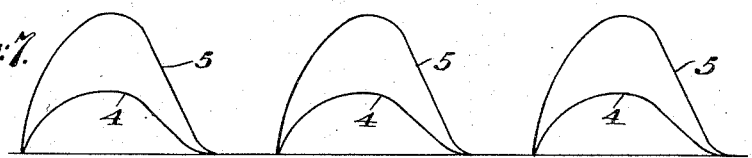
Figure 8:
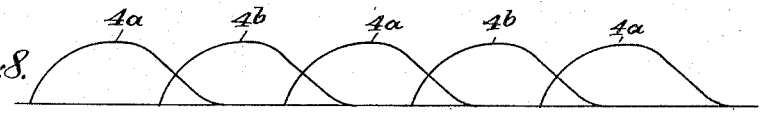
Figure 9:
Figure 10:
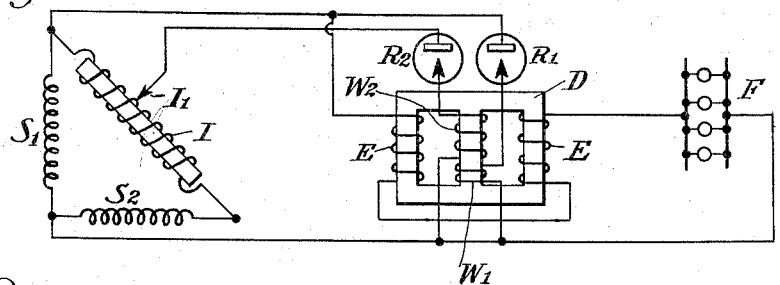
Figure 11:
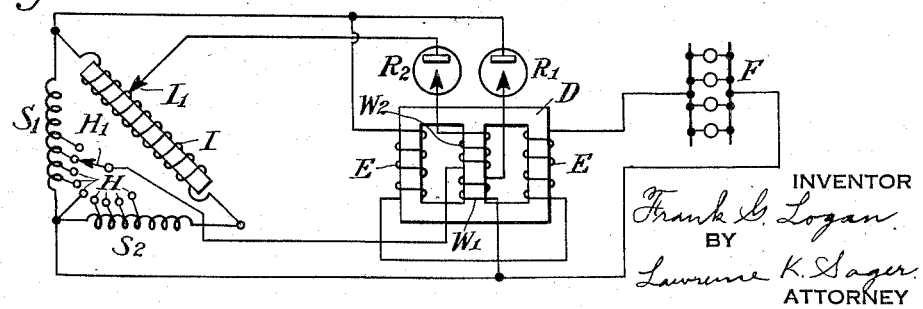
Figure 12:
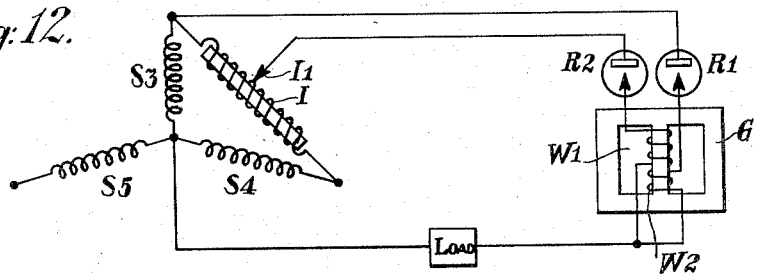
Figure 13:
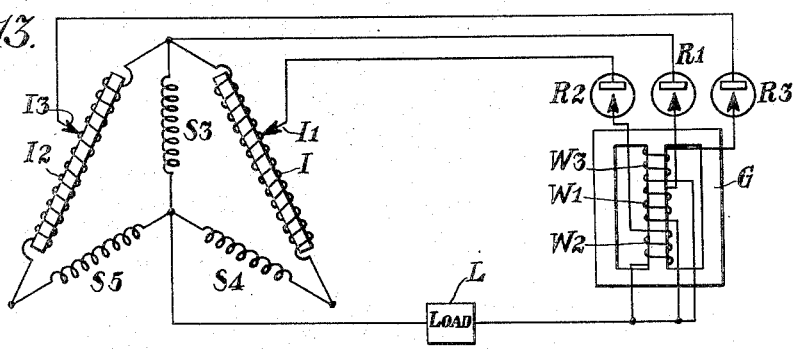
Figure 14:
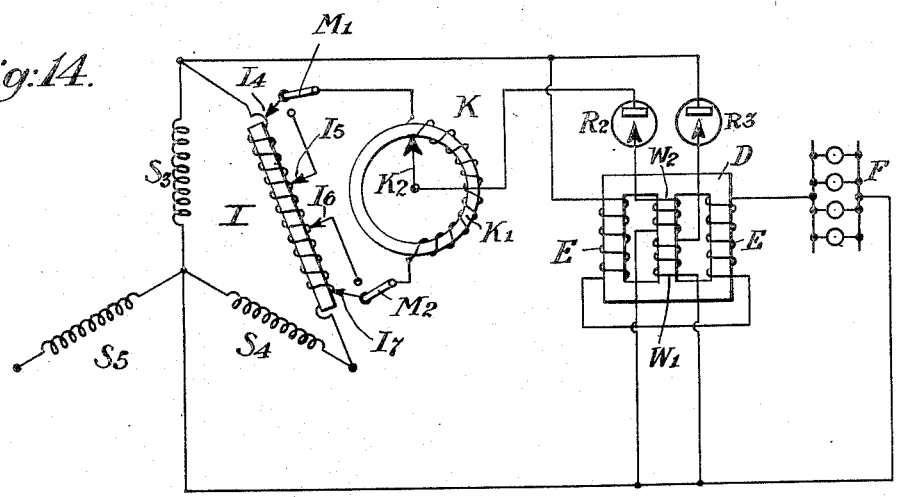

Fig. 1 is a diagram showing one embodiment of the invention in one of its simplest forms and wherein a single phase alternating current source of energy is used; Figs. 2, 3 and 4 are explanatory diagrams; Fig. 5 is a diagram similar to Fig. 1 wherein a lighting circuit is conveniently controlled; Fig. 6 is a diagram showing another embodiment of the invention; Figs. 7, 8 and 9 are explanatory diagrams of the form of the invention disclosed in Fig. 6; Fig. 10 is a diagram showing another embodiment of the invention wherein a two phase alternating current source is used; Fig. 11 is similar to Fig. 10, except that adjustable means is provided to compensate for the inherent change of voltage and to maintain both of the applied voltages constant; Fig. 12 is a diagram showing the invention deriving energy from a three phase source, two phases thereof being utilized; Fig. 13 is a diagram showing a three phase source and wherein all phases are utilized; and Fig. 14 is a diagram wherein one phase of a three phase source is utilized and a comparatively simple illustration is shown of means for gradually decreasing and increasing the controlled current, or lighting effect, with provisions for pre-setting.

Referring to Fig. 1, a single phase source of alternating current S is shown supplying energy to the load L through the controlling means. The current received by the load is uni-directional. One supply line from the source leads to the anode A of the rectifier $R_1$, the cathode C thereof being connected to a winding $W_1$ on a core B of laminated iron or steel; the other terminal of the winding is connected through the load L back to the source. Another rectifier $R_2$ has its cathode connected to a winding $W_2$ on the core B, the other terminal of the winding being connected to the line leading to the load and back to the source of supply. The windings $W_1$ and $W_2$ are so wound and related to each other that they act cumulatively to magnetize the core B in the same direction. This core is shown of the simple core type form, but may be of any other form which permits the flux created by the windings thereon to inter-link cumulatively. The anode of the rectifier $R_2$ is connected to the upper supply line from the source through a phase shifter P which may be of any desired form that will serve to shift, as desired, the phase of the electro-motive force applied to or phase of the current passing through rectifier $R_2$ with reference to that passing through rectifier $R_1$.

Let it be assumed that the phase shifter P is adjusted so as to have no effect upon the phase of the electro-motive force applied to the rectifier $R_2$ with reference to that applied to the rectifier $R_1$. The phase of the electro-motive force applied by these rectifiers to the windings $W_1$ and $W_2$ and to the load are the same and the currents delivered are also in the same phase. The condition in the circuit of the two rectifiers may be represented, for the purpose of general theoretical analysis, as shown in Fig. 2, that is, the electro-motive force applied to the winding $W_1$ and the load by the rectifier $R_1$ may be considered to be a series of intermittent waves 1 of Fig. 2 which are on the positive side of the base line and displaced from each other approximately 180°. Similarly, the electro-motive force applied to the winding $W_2$ and the load by the rectifier $R_2$ would be represented by a series of positive intermittent waves 2, as indicated in Fig. 2, which would be in phase with the waves 1. The particular form of these waves and of the resultant current waves would depend upon the characteristics of the circuit, the form thereof as shown in Fig. 2 being sufficient for explanatory purposes. Under the conditions assumed, no appreciable current will pass through the windings of the core B or through the load; and the output from the source to the core windings and the load will be a minimum and in the form of intermittent waves. Now let it be assumed that the phase shifter is adjusted to cause the electro-motive force applied to the circuit of the rectifier $R_2$ to be shifted in phase with reference to that applied to the circuit of the rectifier $R_1$. Under these conditions the current delivered to the windings $W_1$ and $W_2$ and to the load circuit will gradually increase to a very pronounced extent, until when the phase of the electro-motive force in the circuit of the rectifier $R_2$ is displaced 180° from that of the circuit of the rectifier $R_1$, the maximum current will be delivered to the load circuit. Fig. 3 represents in a general way the 180° phase displacement of the electro-motive force of the two rectifier circuits wherein it will be seen that the electro-motive force waves 2 of the circuit and rectifier $R_2$ are displaced 180° from the electro-motive force waves 1 of the circuit of rectifier $R_1$. Under this condition of maximum output an electro-motive force is at all times applied to the load circuit and the current will continuously flow in the load circuit of a value which will fluctuate somewhat, as indicated by the curve 3 in Fig. 4, the value of the current being dependent upon the total instantaneous values of the electro-motive forces impressed upon the circuits by the two rectifiers. Thus by merely shifting the phase of the electro-motive force and current in one rectifier circuit with reference to that of the other, the current may be varied from a very small value to a very large value, giving a very wide range of control. It will also be observed that this is accomplished without any change in value of the electro-motive forces applied to, or impressed upon, the load circuit, the controlling effect being due merely to the shifting of phase relationship. In carrying the invention into effect, it is essential that the flux due to the current in the windings $W_1$ and $W_2$ be inter-linked as by use of a common core, and that they be additive to each other for securing the greatest range of control. It is due to this inter-linking of the flux through the windings $W_1$ and $W_2$ that the maximum output from the rectifiers is obtained, the current output from one rectifier then assisting the other to maintain the current delivered from the other to an increasing extent with increase of relative phase displacement.

In Fig. 5 the invention is shown applied to the control of a lighting circuit by use of a reactor. This reactor is shown in the form of a three legged laminated core D. On the two outer legs of the core are the alternating current windings E connected in series with each other and with the lamp load F across the source of supply S. The middle leg of the core is embraced by the windings $W_1$ and $W_2$ corresponding to the similarly designated windings in Fig. 1 and connected in their respective rectifier circuits across the supply circuit. It is common practice to use a reactor for controlling the current supplied to a lamp load from an alternating current source by changing the reactance of the core by control of the direct current passing through a winding on the core. This is due to the fact that the reactance is modified by change of current in the direct current winding. When no current passes in this winding, the reactance is at a maximum and a low value of current is supplied to the lamp load; when the direct current winding is receiving maximum current, the reactance is a minimum and the lamp load receives maximum current. By means of the present invention, the reactance of the reactor D may be controlled as desired. It is evident from the foregoing explanations that with the connections and relationship of parts as shown in Fig. 5, that when the phase shifter is adjusted to bring the electro-motive force of the two rectifier circuits in phase with each other, no appreciable current will pass through the windings $W_1$ and $W_2$ on the middle leg of the reactor. The reactance of the core will then be a maximum and the lamp load will receive a minimum amount of energy. When the phase shifter is adjusted to increase the phase difference of the electro-motive force in the rectifier circuits, the windings $W_1$ and $W_2$ will receive an increased amount of current which will correspondingly reduce the reactance of the reactor D and permit an increased current to be delivered to the lamps, until with maximum phase displacement the reactor is without appreciable effect upon the energy delivered to the load and the lamps are then at their full brilliancy.

In some cases, the invention may be embodied in a circuit wherein a single winding is controlled by both rectifiers instead of providing two windings such as $W_1$ and $W_2$. Thus in Fig. 6 a common lead from the cathodes of the two rectifiers passes to the inductive winding $W_4$ on a core G which winding is in series with the load L; or, if desired, the winding $W_4$ may itself be the load and serve as the controlling direct current winding of a reactor for controlling the energy supplied to a consumption circuit, as explained with reference to Fig. 5. In the form shown in Fig. 6 and with the electro-motive force of the two rectifier circuits in phase with each other, the conditions are generally indicated by Fig. 7. Here the curve 4 represents the electro-motive force of each rectifier circuit, one being superimposed upon the other. The resultant current wave in the load circuit will obviously be the sum of the current waves of each rectifier circuit, giving a resultant current wave in the load circuit represented by the waves 5. These are displaced from each other about 180° and owing to the fact that the current is completely interrupted between half waves, the resultant current delivered to the load circuit is very small or negligible. When the phase of the electro-motive force in the circuit of the rectifier $R_2$ is shifted with reference to that in the circuit of the rectifier $R_1$, then a gradually increasing current will pass in the load circuit until at a maximum phase difference of 180° the conditions will be that represented in Fig. 8, the curves 4a representing the electromotive force of one rectifier circuit and the curves 4b representing the electro-motive force of the other rectifier circuit. Under these conditions, the current in the load circuit will be continuous and somewhat pulsating in value as generally indicated in Fig. 9 by the curve 5. Thus in the form shown in Fig. 6, the electro-motive forces in the two rectifier circuits always remain of substantially the same value and the control of the current in the load circuit is obtained by shifting their phase relationship and causing them to act successively on the same circuit resulting in maximum current output with maximum phase displacement, or minimum current output with no phase displacement.

In practice, the use of a special phase shifter may be avoided by using a polyphase source of energy. Thus in Fig. 10 a two phase source is indicated by the windings $S_1$ $S_2$ connected to a neutral point and delivering electro-motive force at a phase displacement of 90°. From the outer terminal of the winding $S_1$ a circuit leads to the rectifier $R_1$ and through a winding $W_1$ back to the neutral point of the source. Between the outer terminals of the windings $S_1$ and $S_2$ is connected an inductive winding I on an iron core and is arranged like a potentiometer so that a movable contact $I_1$ may engage successive turns or successive taps of the winding L from one of its terminals to the other. The adjustable contact $I_1$ is connected to the anode of the rectifier $R_2$, the circuit continuing through the winding $W_2$ back to the neutral point of the source. In this figure a reactor D controlling the supply of current to a lighting circuit F is shown like that already described in connection with Fig. 5.

Let it be assumed that the contact $I_1$ is shifted to be directly connected with the outer terminal of the winding $S_1$ so that none of the impedance device I is included in the circuit of rectifier $R_2$. In this case the electro-motive force of the two rectifier circuits is in a common phase relationship corresponding to the condition already described with reference to Fig. 2 and no appreciable current passes through the windings $W_1$ and $W_2$ and the current in the lamp circuit is a minimum. As the contact $I_1$ is moved along the successive contacts or taps of the impedance or inductive device I, the phase of electro-motive force in the circuit of rectifier $R_2$ is shifted more and more from that in the circuit of the rectifier $R_1$ with a resultant increase in current in the windings $W_1$ and $W_2$ and in the load circuit. When the contact $I_1$ has been moved so as to substantially coincide with the outer terminal of winding $S_2$, the maximum phase displacement of 90° will be obtained with the form of apparatus shown and the current in the windings $W_1$ and $W_2$ and in the lamp circuit will be a maximum, as will be understood from the explanations already given in connection with Figs. 1 to 5.

In the embodiment of my invention shown in Fig. 10, although the electro-motive force applied to the winding $W_1$ by the rectifier $R_1$ will remain substantially constant throughout the controlling action, the electro-motive force of the circuit of the rectifier $R_2$ will change somewhat, not from any adjustment thereof, but due to the inherent effect in the utilization of a polyphase circuit when gradually shifting from one phase to the other. Thus in Fig. 10 it is evident that when the contact $I_1$ coincides with the outer terminal of the winding $S_1$, the full supply of potential will be delivered to the circuit of rectifier $R_2$, being the same as that delivered to the circuit of the rectifier $R_1$. As the contact $I_1$ is moved along the impedance device I, the electro-motive force applied to the circuit of rectifier $R_2$ is gradually decreased until at the mid-point of the inductance I the minimum value of electro-motive force is reached, being the resultant value due to the combined effect of the out of phase relationship of the two windings of the source. As the contact is moved from the mid-point of the impedance device I towards the outer terminal of the winding $S_2$, the electro-motive force is gradually increased until when coinciding with the outer terminal of the winding $S_2$, the electro-motive force of the circuit of rectifier $R_2$ again equals that of the other rectifier circuit. This change of electro-motive force in one of the rectifier circuits is of no advantage in securing the desired control and is due to the inherent result of combining out of phase electro-motive forces. This undesired change of electro-motive force can be avoided by an auxiliary controlling device as indicated in Fig. 11. In this figure the parts and connections are the same as those of Fig. 10, but the inner portions of the windings $S_1$ and $S_2$ are provided with taps leading to a series of contacts H adapted to be successively engaged by a movable contact $H_1$ connected to winding $W_2$. With this form of construction the voltage applied to the circuit of rectifier $R_2$ may be at all times kept at a value approximately equal to that attained when the contact $I_1$ of Fig. 10 is in the mid-position of the impedance device 1. Thus in Fig. 11, when contact $I_1$ is at or near the outer terminal of the winding $S_1$, the contact $H_1$ will be moved to the upper tap from the winding $S_1$ which is at such a point that the voltage applied to the circuit of rectifier $R_2$ is reduced to equal that when the contact $I_1$ is in the mid-point of the impedance device I. As the contact $I_1$ is moved toward the middle of the impedance device I the contact $H_1$ will be moved over the contacts H so as to approximately maintain the same voltage on the circuit of rectifier $R_2$. When the contact $I_1$ is at the mid-point of the inductive device I, the contact $H_1$ will engage the contact which is connected to the neutral point of the source. As the contact $I'$ is moved further along, the contact $H_1$ will be moved to successively engage contacts or taps leading from sections of the winding $S_2$ until when contact $I_1$ is connected directly with the outer terminal of the winding $S_2$, the contact $H_1$ will engage the last contact H. Although the voltage applied to the circuit of rectifier $R_2$ with this form of construction will be less than that applied to the circuit of the rectifier $R_1$, the difference in these fixed values may be compensated for in various ways such as by putting more turns in the winding $W_2$ than in the winding $W_1$. The number of taps or the number of contacts H engaged with windings $S_1$ and $S_2$ may be comparatively small with reference to the number of contacts of impedance device I engaged by the movable contact $I_1$ and still result in delivering a substantially constant voltage to the circuit of rectifier $R_2$. Ordinarily, the change of voltage in the circuit of the rectifier $R_2$ when some such compensating means as H and $H_1$ are not used, will not be sufficiently objectionable for most purposes to require such compensating means.

Fig. 12 shows the invention when utilizing a three phase source for the supply of energy. The three phase source is designated by the windings $S_3$, $S_4$ and $S_5$ and other parts of the diagram are designated with reference characters indicating parts already described. The impedance device I is connected across the outer terminals of two of the three phase windings as shown and the method of control and operation is substantially the same as already described with reference to Fig. 10. A three phase source is preferable, however, to a two phase source because it gives a maximum obtainable phase displacement of 120° instead of 90° in the control of the rectifier circuits and obviously results in a correspondingly greater range of control. Thus in practice, the three phase source when available is preferable for use instead of a two phase source and is likewise more advantageous than the use of a single phase source because a simple form of variable impedance device I may be used instead of a special phase shifter as in Figs. 1, 5 and 6.

In Fig. 13 a three phase source is also used and all three phases are utilized in the control of current delivered to the load instead of two of the phases as in Fig. 12. The corresopnding parts are similarly designated in Fig. 13 and an additional adjustable impedance device $I_2$ is connected between the outer terminals of the phase windings $S_3$ and $S_5$ of the source. From its contact $I_3$ a lead extends to an additional rectifier $R_3$, a connection leading from the cathode thereof through a winding $W_3$ on the core G and thence through a return line to the neutral of the source. In this embodiment of the invention, when the contacts $I_1$ and $I_3$ are moved to be at or near the outer terminal of the winding $S_3$, the electro-motive forces and currents of the three rectifier circuits will all be in the same phase and no appreciable amount of current will be delivered to the windings $W_1$, $W_2$ and $W_3$, or to the load. As the contacts $I_1$ and $I_3$ are shifted simultaneously along their respective impedance devices, the phase displacement in the three rectifier circuits will be gradually increased with a resulting increase in current. When the contacts $I_1$ and $I_3$ are respectively moved to be in direct connection with the outer terminals of the windings $S_4$ and $S_5$, then the maximum phase displacement will occur in each of the rectifier circuits relatively to each other and the maximum current delivered through the windings controlled thereby and to the load. In both Fig. 12 and Fig. 13 there will occur a decrease in the voltage of the rectifier circuits connected to the movable contacts as they are moved from one limit toward the mid-position and the voltage will then increase as the movement is continued from mid-position to the other limit. But this change in voltage, if sufficiently objectionable, may be avoided by the use of taps on the windings $S_3$, $S_4$ and $S_5$, as explained with reference to Fig. 11.

It will be understood that in the various forms of this invention, the load may be connected in series with the windings controlled by the rectifier circuits as indicated in Figs. 1, 6, 12 and 13, or the windings $W_1$, $W_2$ etc. on the common core may themselves be the load on the rectifier circuits as in Figs. 5, 10 and 11, according to the particular purpose for which the invention is to be used.

Fig. 14 shows a simple application of the invention to a control of lighting effects where it is desired to change gradually from one lighting effect of the circuit to another and where the successive required conditions of the lighting circuit may be pre-set to secure the desired sequential conditions. In this figure a three phase source is utilized and a reactor D is shown for controlling the lighting circuit F as described with reference to Fig. 5. In order to permit pre-setting, the impedance device I is provided with a number of movable contacts such as $I_4$, $I_5$, $I_6$ and $I_7$ which lead to contacts adapted to be engaged by switches $M_1$ and $M_2$. These switches are in turn connected to opposite points of an impedance winding K shown wound upon an iron core $K_1$ in the form of a ring. A movable contact $K_2$ connected to the anode of the rectifier $R_2$, is adapted to be rotated and make contact with successive turns or taps of the winding K as indicated in the drawings. If it be assumed that the switches $M_1$ and $M_2$ are closed to connect with contacts $I_4$ and $I_7$ as shown in the drawings and that the contact $K_2$ is in direct connection with the lead from the switch $M_1$ as indicated, then the electro-motive force and current of the two rectifier circuits are in the same phase and no material current is supplied to the lamp circuit. When the contact $K_2$ is rotated in a clockwise direction there will be a gradual shifting in phase of the electro-motive force and current in the circuit of the rectifier $R_2$ until when the contact $K_2$ is in its lowermost position and directly connected with switch $M_2$, the electro-motive force and current in the circuit of rectifier $R_2$ will have its maximum displacement from that of the rectifier circuit $R_1$ and result in the lamps being brought to their maximum brilliancy. If the next scene is to be such as to have a comparatively low lighting effect from the lamp load F, the contact $I_5$ will have been moved to a position to give the desired effect and then the switch $M_1$ will be moved to be in electrical connection with contact $I_5$ and the contact $K_2$ then moved from its lowermost position in a counter clock-wise direction to its uppermost position. This will result in the lamps being brought from maximum brilliancy to the low lighting effect corresponding to the position of the contact $I_5$. If the next scene requires a somewhat greater lighting effect but less than the maximum brilliancy of the lamps, the contact $I_6$ will have been moved to a position to give the desired lighting and then switch $M_2$ will be moved to contact with contact $I_6$ and the contact $K_2$ again rotated in a clock-wise direction bringing the lamps from a low lighting effect to a somewhat increased lighting effect corresponding to the position of the contact $I_6$, the contact $K_2$ being then in its lowest position. Any number of contacts $I_4$ to $I_7$ may be provided and pre-set in positions corresponding to the desired sequential lighting effects and then when the contacts $M_1$ and $M_2$ are connected sequentially to the different contacts engaging the impedance device I, the contact $K_2$ may be rotated through half a circle and a gradual change of lighting effect from one condition to the next desired condition is obtained in regular sequence according to the pre-setting of the contacts and to the movement of the switches $M_1$ and $M_2$. Thus the shifting of the phase of electro-motive force and current in the two rectifier circuits for controlling the lighting effect will be carried out by a gradual change of the phase relationship in the two rectifier circuits and in a desired sequential order by merely connecting the switches M₁ and M₂ to the desired contacts and rotating the contact K₂. Thus the operator may pre-set for various scenes at his convenience and then shift from one to the other by a comparatively simple manipulation of the controlling means.

Furthermore, in addition to providing means for pre-setting the apparatus for any number of sequential scenes and gradually passing from one to the other in the control of the lighting circuit, any number of lighting circuits may be similarly controlled for securing the particular sequentially related effects desired from the different lighting circuits and means provided for gradually shifting from one combined lighting effect to another by a common means controlling all of the circuits. For example, any desired number of controlling means such as shown in Fig. 14 may be connected in parallel to the source and a common means used for rotating the movable contacts K₂ of each group; and it is evident that if the pre-set contacts are arranged to give combined lighting effects in sequential order that all of the contacts K₂ may be simultaneously rotated half a revolution and thereby obtain the desired result in each lighting circuit simultaneously. Ordinarily, the sources represented in the drawings by the windings S₁, S₂, S₃, S₄ etc. will be the secondary windings of transformers and the controlling circuits connected to different phases in order to approximately balance the load on all phases of the source. Also, where a number of groups of circuits are controlled from each secondary winding of a transformer the voltage of all such transformers and of each group controlled thereby may be simultaneously controlled by a master controller as by changing the tap connections of the secondary windings of a master transformer which will serve to change, as desired, the electro-motive force applied to the primary windings of each of the transformers supplying the various groups of controlling means. Where there are several master transformers each controlling the primary voltage of several transformers supplying energy to the various controlling groups, the voltage of the primaries of such master transformers may also be simultaneously controlled by a grand master transformer supplying energy to the primaries of the master transformers. This grand master control may obviously be accomplished by adjustment of tap connections to the secondary windings of the grand master transformer so as to change, as desired, the voltage applied to the primaries of the master transformers. In this way the control of any number of lighting circuits in any way desired may be secured by comparatively simple operating means and which permits pre-setting of all of the different circuits so that the change from one lighting effect to another may be rapidly and conveniently obtained.

It will be understood that in practising this invention any form of rectifier, electric valve or intermittently acting device for supplying the energy to the load, or to the controlling windings W₁, W₂ etc. may be used, although the two-element rectifier appears to be the most desirable type of intermittently acting device, owing to its simplicity compared with other forms of apparatus.

It will also be understood that the electromagnetic device which is supplied with current from the intermittently acting means such as the core having the windings W₁, W₂, etc. thereon may be of widely different forms and that windings corresponding thereto may themselves be the load and of various character according to the particular application of the invention.

It will also be appreciated that the controlling winding such as W₂ may be made of a comparatively large number of turns with reference to those of winding W₁ so as to secure a sufficiently high number of ampere turns therein with a correspondingly smaller value of current in this control circuit permitting the adjustable controlling elements of this circuit to be conveniently operated from a remote control point and utilizing a comparatively small amount of controlling energy compared with the total energy output.

It will be understood that various modifications and applications of this invention may be made without departing from the scope thereof.

I claim:

1. The combination of a source of electric energy, devices connected with said source for intermittently passing current to the consumption circuit, an electro-magnetic device in the consumption circuit supplied with current from said devices, and adjustable controlling means for shifting the time of passing current through said devices relatively to each other for changing the value of the output current over a wide range.

2. The combination of a source of electric energy, devices connected with said source and in parallel with each other for intermittently passing current to the consumption circuit, an electro-magnetic device in the consumption circuit supplied with current from said devices, and adjustable controlling means for shifting the time of passing current through said devices relatively to each other for changing the value of the output current over a wide range.

3. In combination of an alternating current source, rectifiers receiving current from said source, an electro-magnetic device in the consumption circuit receiving current from said rectifiers, and adjustable controlling means for shifting the phase relationship of the electromotive force in the circuits of the rectifiers relatively to each other for changing the value of the output current over a wide range.

4. The combination of an alternating current source, rectifiers receiving current from said source, an electro-magnetic device in the consumption circuit receiving current from said rectifiers, and adjustable controlling means for shifting the phase relationship of the electromotive force in the circuits of the rectifiers relatively to each other for changing the value of the output current over a wide range, said rectifiers being connected in parallel with each other.

5. The combination of an alternating current source, rectifiers receiving current from said source, a winding in series with each of said rectifiers, said windings being related to have the flux thereof interlinked, and adjustable controlling means for shifting the phase relationship of the electro-motive force in the circuits of said rectifiers and windings relatively to each other for changing the value of the output current over a wide range.

6. The combination of an alternating current source, rectifiers receiving current from said source, a winding in series with each of said rectifiers, said windings being related to have the flux thereof interlinked, and adjustable controlling means for shifting the phase relationship of the electro-motive force in the circuits of said rectifiers and windings relatively to each other for changing the value of the output current over a wide range, each of said rectifiers with its respective series windings being connected in parallel with the other.

7. The combination of a single phase source, rectifiers receiving current from said source, an electro-magnetic device in the consumption circuit receiving current from said rectifiers, and an adjustable phase shifter in the circuit of one of said rectifiers for shifting the phase of the electro-motive force therein with reference to the phase of the electro-motve force in the circuit of another of said rectifiers for changing the value of the output current over a wide range.

8. The combination of a polyphase alternating current source, rectifiers receiving current from said source, an electro-magnetic device in the consumption circuit receiving current from said rectifiers, and controlling means for shifting the phase relationship of the electro-motive force in the circuit of said rectifiers by relatively changing the connection of said rectifiers between different phases of said source.

9. The combination of a polyphase alternating current source, rectifiers receiving current from said source, an electro-magnetic device in the consumption circuit receiving current from said rectifiers, an impedance device connected across different phases of said source, and means connected to the circuit of at least one of said rectifiers for adjustably connecting the same to different portions of said impedance device.

10. The combination of a polyphase alternating current source, rectifiers receiving current from said source, an electro-magnetic device in the consumption circuit receiving current from said rectifiers, an impedance device connected across different phases of said source, means connected to the circuit of at least one of said rectifiers for adjustably connecting the same to different portions of said impedance device, and means whereby the remaining terminal of the circuit of said last-named rectifier may be adjustably connected to compensate for the inherent drop in voltage due to adjustment of said first-named means.

11. The combination of an alternating current source, rectifiers receiving current derived from said source, a reactor having an alternating current winding thereon in series with the load and supplied with energy derived from said source, and windings on said reactor for controlling the reactance thereof, said windings being supplied with current from said rectifiers, and adjustable means for shifting the phase relationship of the electro-motive force in the circuits of said rectifiers relatively to each other for changing the value of the output current over a wide range.

12. The combination of a polyphase alternating current source, rectifiers receiving current from said source, an electro-magnetic device receiving current from said rectifiers, an impedance device connected between different phases of said source, a plurality of adjustable contacts adapted to engage said impedance device in different positions, and controlling means adapted to be connected to said adjustable contacts for gradually shifting the phase of the electro-motive force supplied to at least one of said rectifiers from that corresponding to the position of one of said contacts to that corresponding to the position of another of said contacts.

13. The combination of a polyphase alternating current source, rectifiers receiving current derived from said source, a reactor having an alternating current winding thereon in series with the load and supplied with energy derived from said source, windings on said reactor supplied with current from said rectifiers for controlling the reactance of said reactor, an impedance device connected between different phases of said source, a plurality of contacts connected with said impedance device at different parts thereof, and adjustable controlling means in the circuit of at least one of said rectifiers for causing the phase thereof to be relatively gradually shifted from a phase corresponding to one of said contacts to a phase corresponding to the position of another of said contacts.

14. The combination of a polyphase alternating current source, rectifiers receiving current from said source, an electro-magnetic device supplied with current from said rectifiers, an impedance device connected across out-of-phase circuits of said source, contacts adapted to connect with different portions of said impedance device, and controlling means connected in the circuit of at least one of said rectifiers for gradually shifting the phase of electro-motive force delivered thereto from that corresponding to the position of one of said contacts to that corresponding to the position of another of said contacts.

15. The method of controlling the supply of energy to a consumption circuit which comprises intermittently passing current to the consumption circuit in different paths, interlinking the magnetic flux created by the current passing in the different paths, and adjustably shifting the time of passing current through said paths relatively to each other for changing the value of the output current over a wide range.

16. The method of controlling the energy delivered to a consumption circuit which comprises rectifying alternating current and causing the rectified current to be delivered intermittently in different paths to the consumption circuit, causing the flux created by said intermittent currents to be interlinked, and adjustably controlling the phase relationship of said intermittent currents relatively to each other for changing the value of the output current over a wide range.

17. The method of controlling the energy delivered to a consumption circuit which comprises rectifying alternating current and causing the rectified current to be delivered intermittently in different paths to the consumption circuit, causing the flux created by said intermittent currents to be interlinked, and adjustably shifting the relative phase of the alternating current delivered in different paths for rectification for changing the value of the output current over a wide range.

18. The method of controlling the energy delivered to a consumption circuit from a polyphase alternating current source which comprises rectifying the current delivered from different phases of said source and delivering the same to a consumption circuit, interlinking the flux due to said rectified current, and adjustably shifting the relative phase of the electro-motive force delivered from said source between different phases thereof for changing the value of the output current over a wide range.

19. The method of controlling the energy delivered to a circuit which comprises controlling the reactance of the circuit, supplying current intermittently in different paths for affecting said reactance, and adjustably changing the phase of said intermittent currents relatively to each other for changing said reactance and thereby changing the value of the output current over a wide range.

20. The method of controlling the energy delivered to a circuit which comprises controlling the reactance of the circuit, supplying alternating current in different paths, rectifying said current and utilizing the rectified current for affecting said reactance, and adjustably changing the relative phase of the alternating current supplied in said different paths for changing said reactance and thereby changing the value of the output current over a wide range.

21. The combination of a source of alternating current, rectifiers receiving current from said source, an electro-magnetic device receiving current from said rectifiers, means for preselecting the phase relationship of the current to be delivered by said rectifiers to said device, and adjustable means connected with said preselecting means for gradually shifting the phase relationship of the currents relatively to each other delivered by said rectifiers from one relationship to a preselected relationship in increments determined by the subdivisons of said adjustable means.

22. The combination of a source of alternating current, rectifiers receiving current from said source, an electro-magnetic device receiving current from said rectifiers, an adjustable phase shifter for shifting the phase relationship of the currents relatively to each other delivered by said rectifiers, and means connected between said source and said phase shifter for preselecting the phase relationship of the current to be delivered by said rectifiers as determined by adjustment of said phase shifter.

23. The method of controlling the current delivered to a circuit which comprises converting alternating current into intermittent currents displaced in phase, preselecting the relative phase displacement of said currents, and shifting the relative phase displacement from an existing relation to the preselected relation in graduated controlled increments.

FRANK G. LOGAN.